United States Patent [19]
Shoda

[11] Patent Number: 5,474,116
[45] Date of Patent: Dec. 12, 1995

[54] CHIP REMOVING APPARATUS FOR MACHINE TOOL

[75] Inventor: Hiroshi Shoda, Shizuoka, Japan

[73] Assignee: Shoda Iron Works Corporation, Shizuoka, Japan

[21] Appl. No.: 286,461

[22] Filed: Aug. 5, 1994

[30] Foreign Application Priority Data

Apr. 4, 1994 [JP] Japan .................................... 6-090520

[51] Int. Cl.⁶ .................................................. B27G 19/00
[52] U.S. Cl. ........................ 144/252 R; 83/100; 409/137; 451/456
[58] Field of Search .............................. 83/100; 451/456; 408/56, 67; 409/132, 134, 137; 144/1 A, 252 R, 252 A; 30/124

[56] References Cited

U.S. PATENT DOCUMENTS

| 4,957,148 | 9/1990 | Shoda | 144/252 R |
| 5,069,695 | 12/1991 | Austin | 144/252 R |
| 5,100,270 | 3/1992 | Dowdle et al. | 144/252 R |
| 5,107,910 | 4/1992 | Sasaki | 144/251 R |

FOREIGN PATENT DOCUMENTS 2117510A 11/1982 United Kingdom.

Primary Examiner—W. Donald Bray
Attorney, Agent, or Firm—Sughrue, Mion, Zinn, Macpeak & Seas

[57] ABSTRACT

A chip removing apparatus for a machine tool by which strong spiral air flows are produced in a dust collection cover to compulsorily move chips upwardly into a chip sucking passage to remove the chips efficiently. The chip sucking passage is defined between a housing of a working head and a motor accommodated in the housing, and a tool chuck is connected to a rotary shaft of the motor. The dust collection cover is mounted at a lower portion of an outer periphery of the housing and surrounds the tool chuck with a dust collection space left therebetween. The chip sucking passage in communication at a lower portion thereof with an upper portion of the dust collection space, and is connected at an upper portion thereof to a suction duct. A plurality of pipes having injection openings opened to the dust collection space or a plurality of holes formed in a lower portion of the dust collection cover and opened to the dust collection space with an air supply passage formed in a wall of the dust collection cover and communicated with the holes are provided for injecting air in circumferential directions into the dust collection space to produce whirling air flows in the dust collection space.

5 Claims, 5 Drawing Sheets

CHIP REMOVING APPARATUS FOR MACHINE TOOL

BACKGROUND OF THE INVENTION

1. Field of the Invention

This invention relates to a chip removing apparatus for a machine tool such as a wood working machine wherein chips produced by cutting by means of a tool attached to a lower portion of a working head are sucked upwardly to remove them.

2. Description of the Related Art

Conventionally, various chip removing apparatus are known, and an exemplary one of such conventional chip removing apparatus is shown in FIG. 5. Referring to FIG. 5, a working head 2 is mounted for upward and downward movement on a cross rail or column 1 of a machine tool. The working head 2 includes a motor 4 disposed in an inverted posture in a casing 3 having a tubular configuration. A tool chuck 5 is connected to a rotary shaft of the motor 4 and extends downwardly from a central portion of the bottom of the casing 3 so that a tool 6 such as an end mill or a drill is removably attached to the working head 2 by means of the tool chuck 5. A chip sucking passage 7 is defined between the casing 3 and the motor 4 and extends in the upward and downward direction through the working head 2. The chip sucking passage 7 passes a plurality of locations on an outer periphery of the motor 4 from a lower portion of the casing 3 and gathers together at a top portion of the casing 3. The chip sucking passage 7 is in communication with a suction duct not shown by way of a hose 8 connected to the top end of the casing 3.

A dust collection cover 9 formed cylindrically from a light alloy material, is fitted downwardly on and fixed to an outer periphery of a lower portion of the casing 3. A flexible annular skirt member 10 in the form of a brush extends downwardly from a lower circumferential edge of the dust collection cover 9 such that it surrounds outer peripheries of the tool chuck 5 and the tool 6 fastened to the tool chuck 5. In order to removably mount the dust collection cover 9 on the casing 3, rack-like teeth 11 are formed on the outer periphery of a lower portion of the casing 3, and a locking pawl 12 is mounted for pivotal motion on an inner face of a side portion of the dust collection cover 9. The locking pawl 12 is normally biased in a direction by a spring 14 so that it may be normally engaged with the teeth 11 on the casing 3.

The conventional chip removing apparatus, however, is disadvantageous in that, since chips collected in the dust collection cover 9 are sucked into the chip sucking passage 7 only by an air sucking force from the chip sucking passage 7, chips collected are not driven readily by air flows flowing upwardly in the dust collection cover 9 and cannot be removed smoothly. In particular, chips produced upon working by the tool 6 which rotates at a high speed are scattered radially outwardly by a strong centrifugal force, and consequently, the chips are not readily moved upwardly, that is, toward the chip sucking passage 7.

SUMMARY OF THE INVENTION

It is an object of the present invention to provide a chip removing apparatus for a machine tool by which strong spiral air flows are produced in a dust collection cover to compulsorily move chips upwardly into a chip sucking passage to remove the chips efficiently.

In order to attain the object described above, according to the present invention, there is provided a chip removing apparatus for a machine tool, which comprises a working head including a housing, a motor accommodated in the housing with a chip sucking passage defined therebetween, a tool chuck connected to a rotary shaft of the motor for removably receiving a tool, a cylindrical dust collection cover mounted at a lower portion of an outer periphery of the housing in such a manner as to surround the tool chuck with a dust collection space left therebetween, and an air injection means for injecting air in circumferential directions into the dust collection space to produce whirling air flows in the dust collection space, the chip sucking passage being in communication at a lower portion thereof with an upper portion of the dust collection space, and being connected at an upper portion thereof to a suction duct.

With the chip removing apparatus of the present invention, air injected from the air injection means is sucked into the chip sucking passage while whirling in the dust collection space, and the air makes strong spiral air flows which rise while whirling. Consequently, chips can be sucked strongly into the chip sucking passage by the strong spiral air flows. Accordingly, a high chip removing efficiency can be achieved.

The air injection means may include a plurality of pipes having injection openings opened to the dust collection space or a plurality of holes formed in a lower portion of the dust collection cover and opened to the dust collection space. Where the air injection means includes a plurality of holes, an air supply passage is formed in a wall of the dust collection cover and in communication with the holes.

Preferably, the air injection means injects air in circumferential, obliquely upward directions into the dust collection space.

Preferably, the chip removing apparatus for a machine tool further comprises an air nozzle disposed on an outer periphery of the tool chuck for injecting air downwardly toward an outer periphery of a tool attached to the tool chuck. In this instance, chips can be blown off through a cut hole formed in a work by the tool held on the tool chuck so that they may be caught into the spiral air flows produced in the dust collection space.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
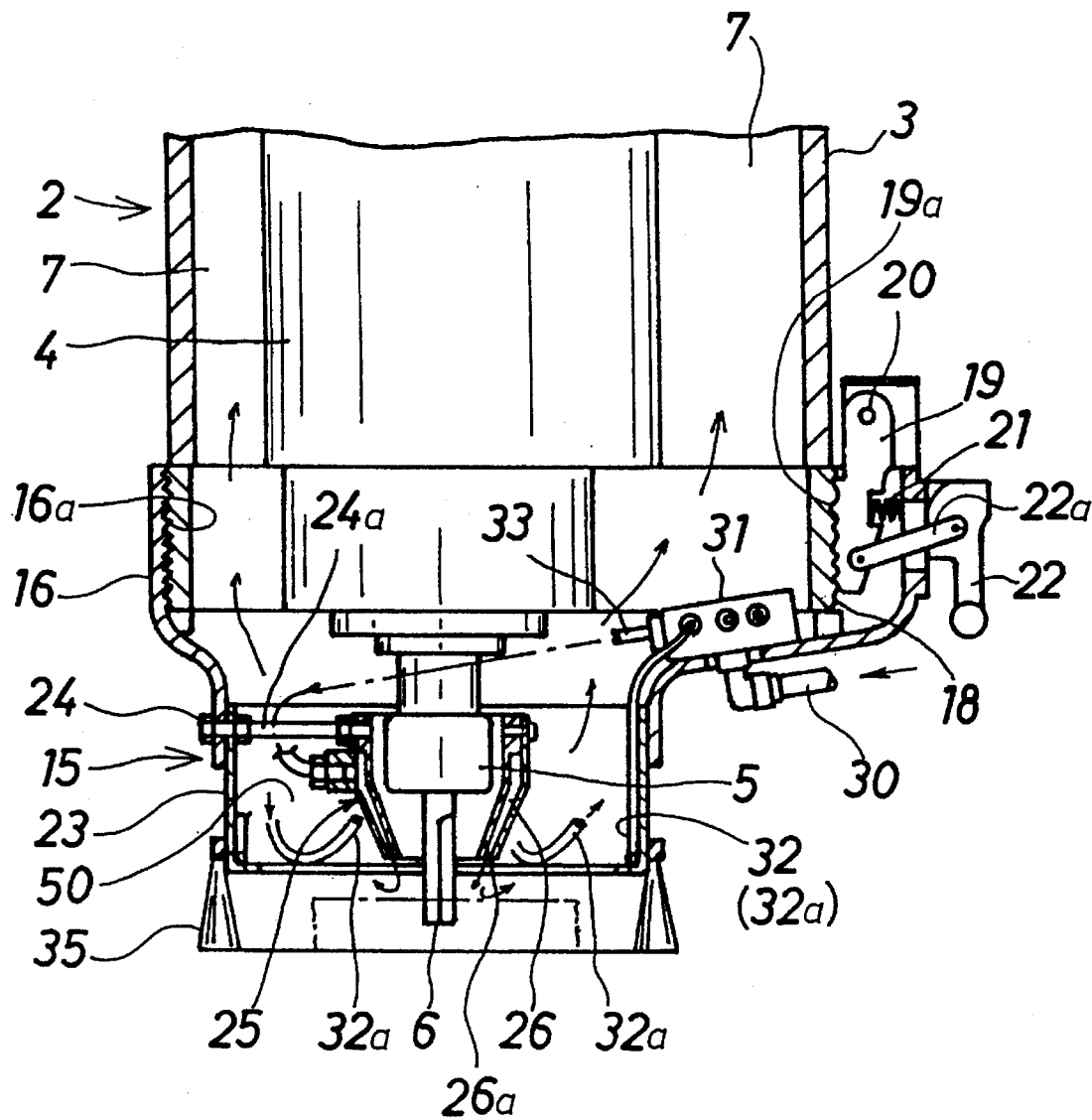
FIG. 1 is a partial sectional view of a chip removing apparatus showing a first preferred embodiment of the present invention.
Figure 2:
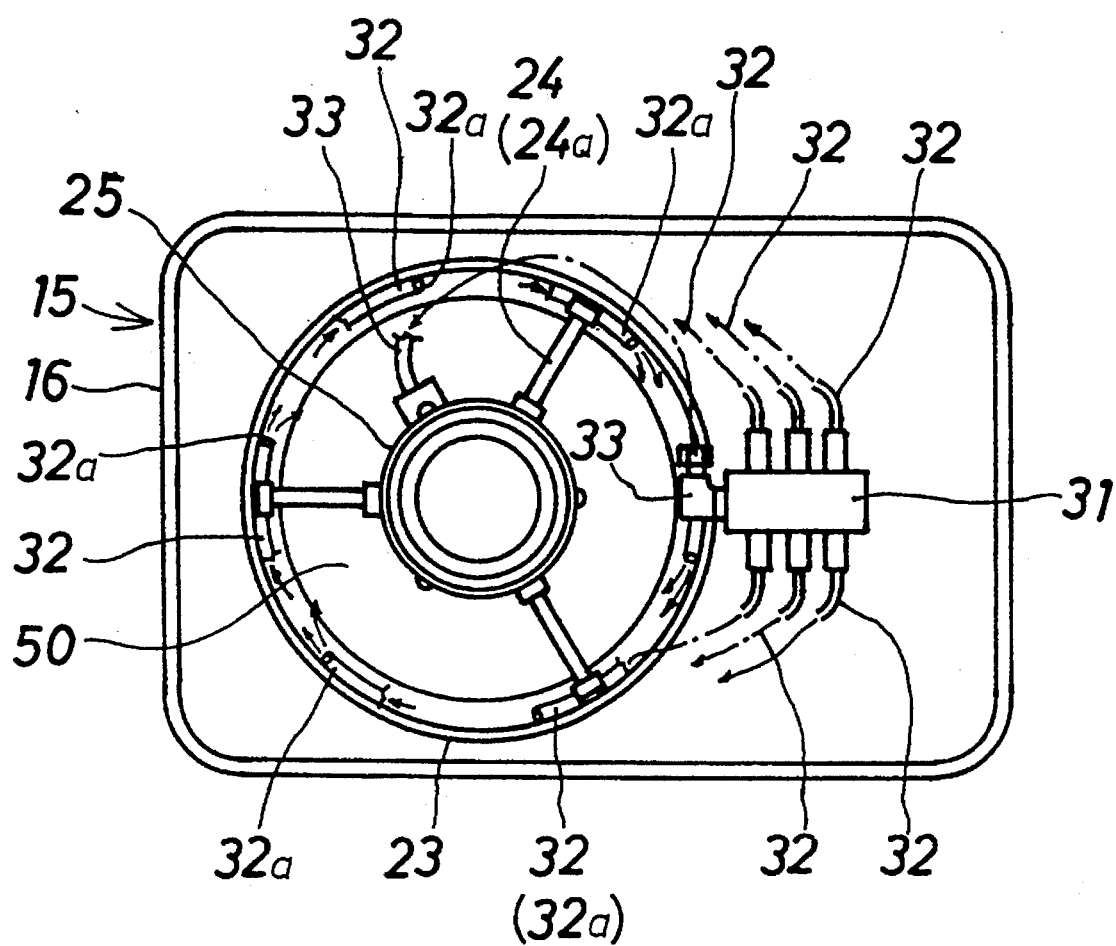
FIG. 2 is a plan view showing a dust collection cover and the internal structure of the chip removing apparatus shown in FIG. 1.
Figure 5:
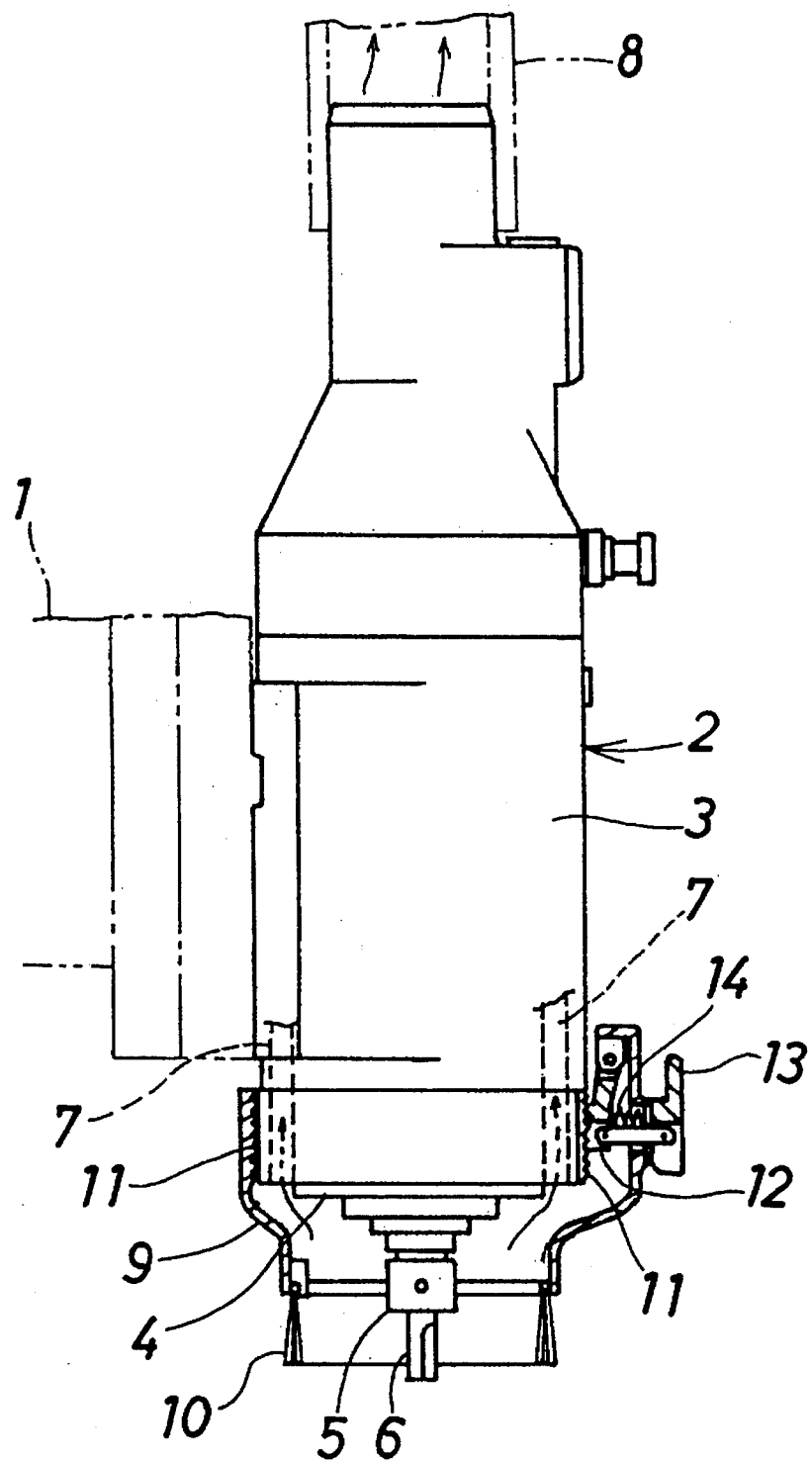
FIG. 5 is a side elevational view, partly broken, showing a conventional chip removing apparatus.

Referring first to FIGS. 1 and 2, there is shown a chip removing apparatus according to a first preferred embodiment of the present invention. The chip removing apparatus is an improvement to and has a generally similar construction to that of the conventional chip removing apparatus described hereinabove with reference to FIG. 5, and description of common components is omitted herein to avoid redundancy.

A dust collection cover 15 is comprised of an upper cover 16 and a lower cover 23. The upper cover 16 has, as viewed from above, a rectangular shape at an upper portion thereof and a cylindrical shape at a lower portion thereof. A locking pawl 19 having teeth 19a thereon is mounted for pivotal motion on an inner face of a side portion of the upper portion of the upper cover 16 by means of a pin 20 while a lever 22 is mounted on an outer face of the upper portion of the upper cover 16. The lever 22 and the locking pawl 19 are connected to each other by way of a link 22a, and the locking pawl 19 is normally biased in one direction by a spring 21. Rack-like teeth 18 are formed on an outer face of a lower portion of a casing 3, and teeth 16a are formed at a portion of an inner face of an upper portion of the upper cover 16.

The teeth 16a of the upper cover 16 are engaged with the teeth 18 of the casing 3 and the teeth 19a of the locking pawl 19 are engaged with the teeth 18 of the casing 18 to mount the upper cover 16 on the outer periphery of the lower portion of the casing 3. Where the upper cover 16 is mounted in this manner, the cylindrical lower portion of the upper cover 16 projects downwardly from the lower end of the housing 3. Meanwhile, the upper cover 16 can be removed readily from the casing 3 by operating the lever 22 to disengage the teeth 19a of the locking pawl 19 from the teeth 18 of the casing 3 and disengaging the teeth 16a of the upper cover 16 from tile teeth 18 of the casing 3.

The lower cover 23 has a cylindrical configuration and is fitted, at an upper end portion thereof, in a lower portion of the upper cover 16 and is secured, at three circumferential locations thereof, to the upper cover 16 by means of bolts 24. The lower cover 23 surrounds the outer periphery of a tool chuck 5 and the outer periphery of a tool 6 fastened to the tool chuck 5 to define a dust collection space 50 between them.

An air nozzle 25 is disposed at a central portion in the lower cover 23 such that it surrounds the tool chuck 5 and part of the tool 6. The air nozzle 25 is held on the lower cover 23 by the bolts 24 by screwing end portions of threaded extensions 24a of the bolts 24 into threaded holes of the air nozzle 25. The air nozzle 25 has a double cylinder configuration having a reduced diameter at a lower portion thereof and has an annular gap 26 defined between the inner tube and the outer tube thereof. The annular gap 26 has an annular injection, opening 26a at the lower end thereof.

A branch joint 31 is mounted on an inner face of the upper cover 16. The branch joint 31 is connected to an air pump not shown by way of an air supply pipe 30 located outside the upper cover 16. For example, six injection pipes 32 and one connection pipe 33 are connected to the branch joint 31 in the upper cover 16. The six injection pipes 32 extend downwardly along the inner face of the lower cover 23, and injection openings 32a at ends of them are arranged at equal pitches in a circumferential direction at the lower end of the lower cover 23 and are directed obliquely upwardly in the same circumferential directions, Meanwhile, the connection pipe 33 is connected at an end thereof to an upper portion of the air nozzle 25 so that air can be supplied therethrough into the gap 26 of the air nozzle 25 described above.

A flexible annular skirt member 35 in the form of a brush is supported at and extends downwardly from the lower end of the lower cover 23. The skirt member 35 extends downwardly a little farther than the lower end of the tool 6 mounted on the tool chuck 5 and surrounds the outer periphery of the tool 6.

In the chip removing apparatus of the first embodiment described above, when air in the dust collection cover 15 is sucked by a negative pressure of the chip sucking passage 7 in the casing 3, external air outside the dust collection cover 15 flows into the dust collection space 50 through the skirt member 35 so that ascending air flows are produced toward the chip sucking passage 7. Meanwhile, when the air pump not shown is rendered operative to supply compressed air into the air supply pipe 30, air is fed under pressure into the injection pipes 32 and the;connection pipe 33 by way of the branch joint 31. The air fed under pressure into the connection pipe 33 is then injected annularly and downwardly from the injection opening 26a at the lower end of the air nozzle 25 to blow off chips produced by cutting operation of the tool 6 in radially outward directions. Meanwhile, the air from the injection opening 32a of each of the injection pipes 32 is injected obliquely upwardly in a circumferential direction (in a clockwise direction in FIG. 2) toward a lower location in the dust collection cover 15 so that a whirling air flow directed upwardly is produced in the dust collection space 50. The whirling air flows cooperate with the ascending air flow caused by the sucking operation of the chip sucking passage 7 to produce strong spiral air flows, which move the chips upwardly in the dust collection cover 15 toward the chip sucking passage 7.

Figure 3:
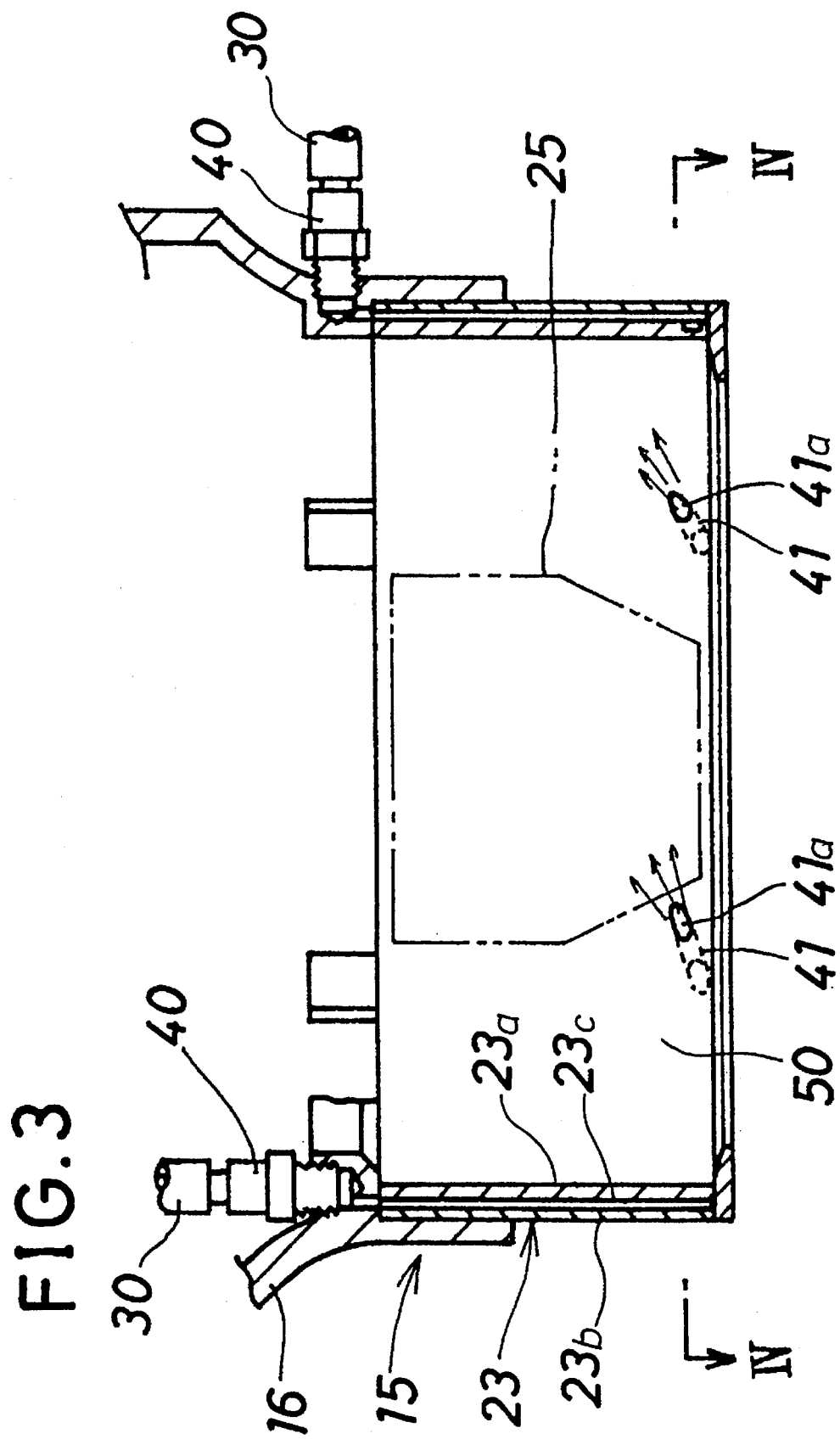
FIG. 3 is a partial sectional view of another chip removing apparatus showing a second preferred embodiment of the present invention.
Figure 4:
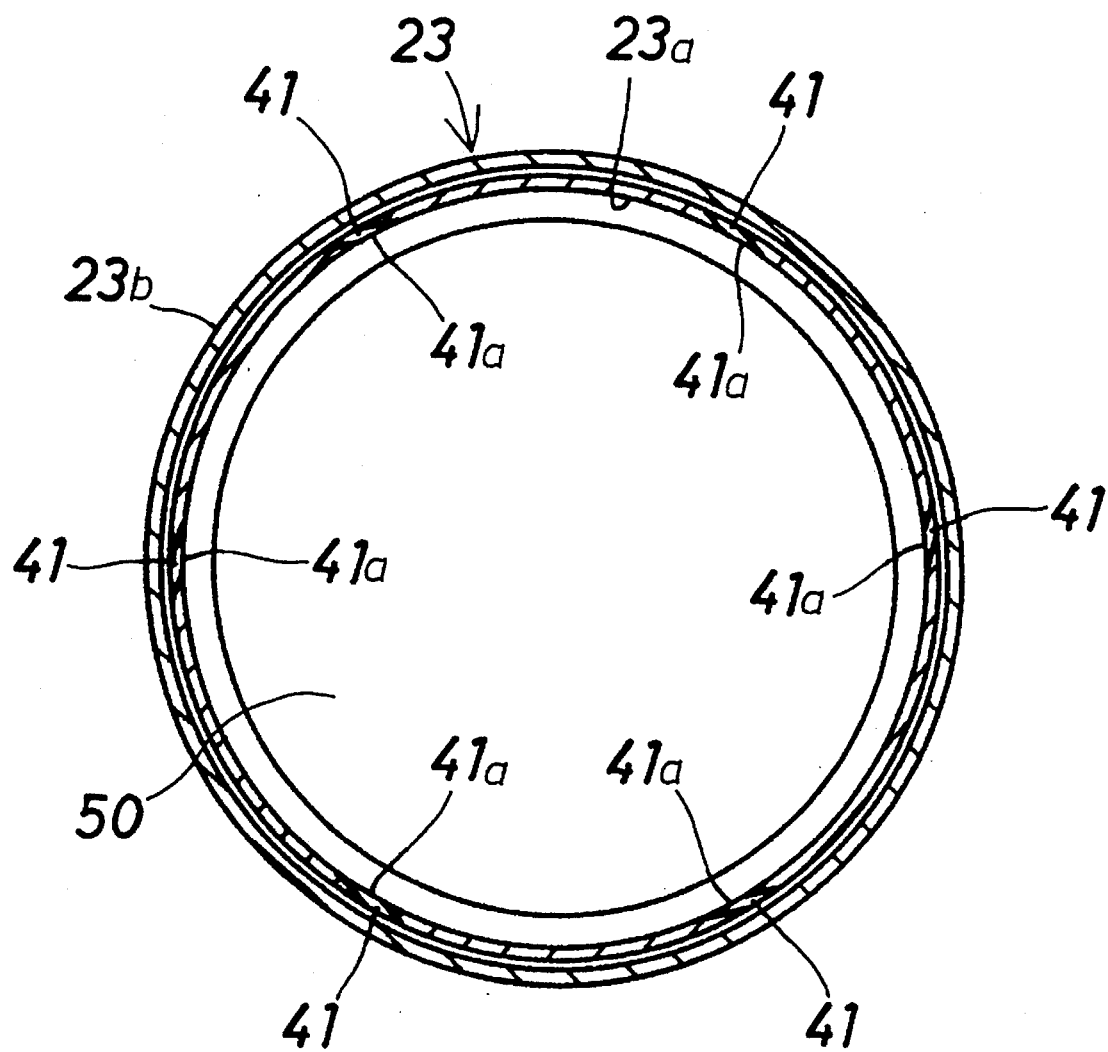
FIG. 4 is a sectional view taken along line IV—IV of FIG. 3.

Referring now to FIGS. 3 and 4, there is shown a chip removing apparatus for a machine tool according to a second preferred embodiment of the present invention. Also the present chip removing apparatus is a modification to and has a generally similar construction to that of the conventional chip removing apparatus described hereinabove with reference to FIG. 5, and overlapping description of common components is omitted herein to avoid redundancy.

In the present chip removing apparatus, a lower cover 23 of a dust collection cover 15 has a double wall structure including an inner tube 23a and an outer tube 23b between which a closed air supply chamber 23c is defined. A pipe coupling 40 is mounted in a vertical direction or a horizontal direction and is communicated with the air supply chamber 23c, and an air supply pipe 30 similar to that in the chip removing apparatus of the first embodiment is connected to the pipe coupling 40. Further, for example, six injection holes 41 are formed at equal pitches in a circumferential direction at a lower portion of the inner tube 23a. Each of the injection holes 41 is communicated with the air supply chamber 23c and extends in a circumferential direction from the communicating portion thereof in an inclined relationship by a predetermined angle in an obliquely upward direction and terminates at an upper end thereof, in an injection opening 41a which is opened to the inner face of the inner tube 23a.

In the chip removing apparatus of the second embodiment, when compressed air is supplied from the air supply pipe 30 into the air supply chamber 23c by way of the pipe coupling 40, it passes the injection holes 41 and is injected from the injection openings 41a obliquely upwardly in circumferential directions toward lower locations in the dust collection cover 15 so that, similarly as in the chip removing apparatus of the first embodiment, upward spiral air flows are produced in the dust collection cover 15 and move chips in the dust collection cover 15 upwardly toward the chip sucking passage 7.

With the chip removing apparatus of the second embodiment having the construction described above, the branch joint 31 and the injection pipes 32 in the chip removing apparatus of the first embodiment can be omitted, and the inner face of the dust collection cover 15 is formed so smooth that chips can flow smoothly toward the chip sucking passage. It is to be noted that the air nozzle 25 shown in FIGS. 1 and 2 may be omitted where the tool 6 has a large size.

Having now fully described the invention, it will be apparent to one of ordinary skill in the art that many changes and modifications can be made thereto without departing from the spirit and scope of the invention as set forth herein.

What is claimed is:

1. A chip removing apparatus for a machine tool, comprising:

a working head including a housing, a motor disposed in said housing with a chip sucking passage defined therebetween, and a tool chuck connected to a rotary shaft of said motor for removably receiving a tool;

a cylindrical dust collection cover mounted at a lower portion of an outer periphery of said housing in such a manner as to surround said tool chuck with a dust collection space left therebetween; and an air injection means for injecting air in circumferential directions into said dust collection space to produce whirling air flows in said dust collection space, wherein a lower portion of said chip sucking passage is in communication with an upper portion of said dust collection space, and an upper portion of said chip sucking passage is connected to a suction duct.

2. A chip removing apparatus for a machine tool as claimed in claim 1, wherein said air injection means includes a plurality of pipes having injection openings opened to said dust collection space.

3. A chip removing apparatus for a machine tool as claimed in claim 1, wherein said air injection means includes a plurality of holes formed in a lower portion of said dust collection cover and opened to said dust collection space, and an air supply passage formed in a wall of said dust collection cover, said air supply passage being in communication with said holes.

4. A chip removing apparatus for a machine tool as claimed in claim 1, wherein said air injection means injects air in circumferential, obliquely upward directions into said dust collection space.

5. A chip removing apparatus for a machine tool as claimed in claim 1, further comprising an air nozzle disposed on an outer periphery of said tool chuck for injecting air downwardly toward an outer periphery of a tool attached to said tool chuck.

* * * * *